UNITED STATES PATENT OFFICE.

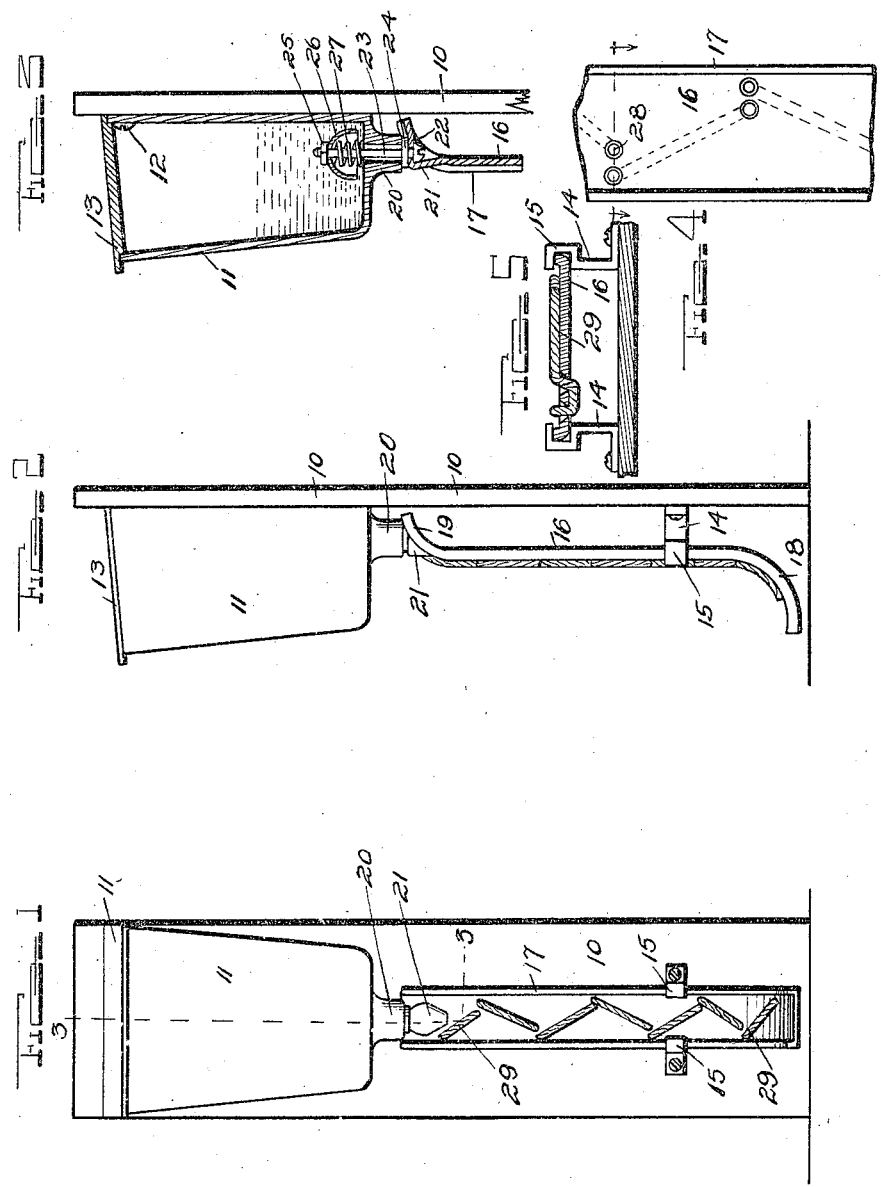

RUFUS C. BOLDRY, OF OSKALOOSA, IOWA, ASSIGNOR TO HARRY E. DAVIS, OF OSKALOOSA, IOWA.

HOG-OILER OR ANIMAL-OILER.

1,237,606.       Specification of Letters Patent.      Patented Aug. 21, 1917.

Application filed May 11, 1917. Serial No. 167,938.

*To all whom it may concern:*

Be it known that I, RUFUS C. BOLDRY, a citizen of the United States, and resident of Oskaloosa, in the county of Mahaska and State of Iowa, have invented a certain new and useful Hog-Oiler or Animal Oiler, of which the following is a specification.

My invention relates to hog oilers or animal oilers.

The object of my invention is to provide an animal oiling device of simple, durable and inexpensive construction.

More particularly it is my object to provide an animal oiling device, comprising a container, a supporting member slidably mounted below said container, a valve operatively connected with the supporting device, said supporting device carrying a peculiarly arranged absorbent or ordinary wick, or rope.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a front elevation of an animal oiling device embodying my invention.

Fig. 2 shows a side elevation of the same.

Fig. 3 shows a vertical, sectional view taken on the line 3—3 of Fig. 1.

Fig. 4 shows a detail front or face view of part of the supporting member for the absorbent.

Fig. 5 shows a horizontal, sectional view taken on the line 5—5 of Fig. 4.

In the accompanying drawings, I have used the reference numeral 10 to indicate a supporting post or the like, on which my improved animal oiling device is mounted.

Supported on the post 10 is a receptacle 11, which may be mounted on the post 10 by means of screws 12 or in any suitable manner.

The receptacle 10 has a removable cover or top 13. Mounted on the post 10 below the receptacle 11 are a pair of horizontally spaced bracket members 14 extending away from the post, and having at their outer ends opposite channels 15 opening toward each other.

Slidably mounted for vertical reciprocation in the guides formed by the channels 15 is a supporting device for the absorbent, to be hereinafter described, comprising an upright member 16 preferably formed of a metal casing substantially flat having at its edges forwardly projecting ribs 17. The support 16 is curved downwardly and forwardly at its lower end at 18, and upwardly and rearwardly at its upper end at 19.

The receptacle is provided at its lower end with a downward, lateral cylindrical extension 20.

In the portion 19 of the support 16 is formed a central upwardly extending portion 21, having at its upper portion a rearwardly extending member 22 in which is provided an opening registering with the opening in the extension 20. Extending through the openings described, is a bolt 23 the head of which rests below the portion 22, as shown in Fig. 3. Between the portion 22 and the lower end of the extension 20 is a washer 24. The bolt 23 extends upwardly into the receptacle 11, and has on its end a nut 25.

Mounted on the bolt 23 within the receptacle is a downwardly opening bell-shaped cup 26. Between the bottom of the cup 26 and the bottom of the receptacle 11 is a coil spring 27 designed to hold the support 16 and the bolt 23 in their upper positions with the washer 24 serving as a valve to close the lower end of the opening in the extension 20.

Formed in the support 16 near one side thereof is a series of pairs of holes 28 tapered toward the rear. The holes 28 of each pair are spaced from each other horizontally, and the pairs of each series are spaced vertically. The pairs of one series are near one side of the plate 16 and the pairs of the other series are near the other side.

I provide an absorbent which may be an ordinary rope 29. The rope 29 is knotted at one end and is then extended through one of the upper holes 28, thence diagonally across and downwardly in the front face of the plate 17, thence rearwardly through the left-hand hole of the next lower pair of holes 28 in the series on the other side of the support 16, thence diagonally downwardly and toward the other side of the support 16, thence rearwardly through the right-hand hole of the next lower pair of holes 28 of the left-hand side of the support 16, thence forwardly to the left-hand hole of said pair and so on.

It will be obvious that this threading of the rope 29 leaves a series of stretches arranged, as shown in Fig. 1, each of said stretches extends from its upper end downwardly and diagonally across the front face of the member 17, and terminates above the next lower stretch of the rope.

In the practical operation of my animal oiler, the spring 26 normally serves to hold the washer 24 against the lower end of the extension 30 for forming a valve closure device. If the hog or other animal rubs up and down against the rope 29 and the support 17, and imparts vertical reciprocating movement to the support 16, the downward movement on said support will lower the washer 24 and oil will be permitted to pass downwardly through the opening in the extension 20 to the top and sides of the members 22 and 21, and thence downwardly over the front face of the support 17. It will be seen that the path of travel of the oil will be along the rope 29 which serves as an absorbent.

It should also be noted that if the animal should lie down on the lower end of the support 16, the edges of the bell-shaped cup 26 will engage the bottom of the receptacle 11 and prevent the continuous flow of oil from the receptacle. In other words, the bell-shaped cup 26 serves as a measuring device for causing the oil to be discharged to the support 16 in certain predetermined quantities and prevents the waste of oil.

The advantages of an animal oiling device of the kind set forth herein are largely obvious from the foregoing description.

It will be seen that the device is very simple in its construction, and hence can be made at a very low price.

The absorbent 29, if it is an ordinary piece of rope, can be replaced whenever desired.

The absorbent guides and regulates the flow of oil down the support 16 and always affords an oil soaked device against which animals may rub.

Some changes may be made in the construction and arrangement of the parts of my improved oiling device without departing from the spirit and purpose of my invention, and it is my intention to cover by this application any modified forms of structure or use of mechanical equivalents, which may be reasonably included within the scope of my claims.

I claim as my invention:

1. An animal oiling device comprising a receptacle, an upright member mounted for sliding reciprocation below said receptacle, said receptacle having a passage extending through its bottom to the upper end of said member, a valve device operatively connected with said member adapted to normally close said passage, said valve device comprising a bolt extended through said passage and connected with said member, a closure device adapted to close the lower end of said passage, and a spring for normally holding said closure device in position for closing said passage.

2. An animal oiling device comprising a receptacle, an upright member mounted for sliding reciprocation below said receptacle, said receptacle having a passage extending through its bottom to the upper end of said member, a valve device operatively connected with said member adapted to normally close said passage, said valve device comprising a bolt extended through said passage and connected with said member, a closure device adapted to close the lower end of said passage, a spring for normally holding said closure device in position for closing said passage, and an inverted bell-shaped cup supported on said bolt within said receptacle.

3. An animal oiling device, comprising a receptacle, an upright member mounted for sliding reciprocation below said receptacle, said receptacle having a passage extending through its bottom to the upper end of said member, a valve device operatively connected with said member adapted normally to close said passage, said member having a plurality of horizontally spaced pairs of openings arranged in two series near the respective sides of said member, an absorbent device threaded through said openings for forming a successive series of stretches of said absorbent device, each stretch being arranged in inclined position across the front face of said support, and terminating at its lower end above the next lower stretch.

4. In an animal oiling device, a supporting device, a receptacle mounted above said supporting device and adapted to discharge oil thereon, said supporting device having on its face a plurality of openings, an absorbent and oil carrying device threaded through said openings having stretches, each inclined diagonally across the front face of said supporting device and terminating at its lower end above the upper end of the next lower stretch.

Des Moines, Iowa, Apr. 24, 1917.

RUFUS C. BOLDRY.